(12) United States Patent
Matsueda et al.

(10) Patent No.: US 7,195,088 B2
(45) Date of Patent: Mar. 27, 2007

(54) BICYCLE DRIVE UNIT AND BICYCLE CHAIN STAY

(75) Inventors: Keiji Matsueda, Shimonoseki (JP); Keita Tanaka, Shimonoseki (JP)

(73) Assignee: Shimano Inc., Osaka (JP)

( * ) Notice: Subject to any disclaimer, the term of this patent is extended or adjusted under 35 U.S.C. 154(b) by 140 days.

(21) Appl. No.: 11/043,941

(22) Filed: Jan. 28, 2005

(65) Prior Publication Data

US 2005/0253356 A1  Nov. 17, 2005

(30) Foreign Application Priority Data

May 13, 2004  (JP) .............................. 2004-143746

(51) Int. Cl.
  *B62K 11/00*  (2006.01)
  *B62M 23/02*  (2006.01)
  *B60K 1/00*  (2006.01)
(52) U.S. Cl. ...................... 180/205; 180/206; 180/207; 180/65.3; 180/65.6
(58) Field of Classification Search ...... 180/65.1–65.5, 180/65.6, 205–207, 220; 475/296–298
See application file for complete search history.

(56) References Cited

U.S. PATENT DOCUMENTS 5,967,937 A * 10/1999 Matsuo ....................... 475/297
6,189,908 B1   2/2001 Lu
6,206,799 B1 * 3/2001 Matsuo et al. ............... 475/297
6,263,993 B1 * 7/2001 Lin ............................. 180/206
6,355,996 B1 * 3/2002 Birkestrand .................. 310/54
6,380,731 B1 * 4/2002 Nishimoto ................... 324/173
2002/0094906 A1  7/2002 Jordan

FOREIGN PATENT DOCUMENTS

DE        29801930 U1    3/1998
DE      198 40 576 A1    9/2000
DE        20207140 U1    9/2002
EP         0537693 A     4/1993

* cited by examiner

*Primary Examiner*—Lesley D. Morris
*Assistant Examiner*—Marc A. Scharich
(74) *Attorney, Agent, or Firm*—Global IP Counselors, LLP

(57) ABSTRACT

A bicycle drive unit comprises a frame main unit, first and second cover members, a rear hub, a rear gear shift apparatus, an electric driving mechanism and a power supply unit. The frame main unit diverges from a front end portion toward first and second rear end portions with the front end portion movably coupled to a frame of a bicycle, and the first and second rear end portions coupled to the rear hub. The first and second cover members are coupled to transverse outer surfaces of the frame main unit such that a first space is formed between the first cover member and the frame main unit and a second space is formed between the second cover member and the frame main unit. The electric driving mechanism is disposed in the first space and linked to the rear gear shift apparatus.

19 Claims, 13 Drawing Sheets

BICYCLE DRIVE UNIT AND BICYCLE CHAIN STAY

CROSS-REFERENCE TO RELATED APPLICATIONS

This application claims priority to Japanese Patent Application No. 2004-143746. The entire disclosure of Japanese Patent Application No. 2004-143746 is hereby incorporated herein by reference.

BACKGROUND OF THE INVENTION

1. Field of the Invention

The present invention relates to a bicycle drive unit and a bicycle chain stay configured and arranged to be coupled to a rear wheel and to be mounted to a bicycle frame.

2. Background Information

A bicycle usually includes a frame, a drive unit, and front and rear wheels that are mounted to front and rear ends of the frame, respectively. The drive unit is mounted to the frame and left and right cranks are rotatably mounted to the drive unit. German Laid-Open Patent Publication No. DE 198 40 576 discloses a drive module as one example of such bicycle drive unit in which a driving device is integrally formed with the rear end of the frame and the drive module is installed in a bicycle. When this type of bicycle drive unit (drive module) is used, the bicycle becomes easier to assemble and the cost of the bicycle can be reduced.

The conventional bicycle drive unit as disclosed in the above mentioned reference includes a support member (one example of a frame main unit and a chain stay) that comprises the rear end of the frame, a crank mounting shaft and a rear wheel axle that are mounted to front and rear end portions of the support member, respectively, right and left cranks that are mounted to both axial ends of the crank mounting shaft, and an internal gear shift hub mounted to the rear wheel axle. The internal gear shift hub includes a brake. A front sprocket is mounted to the right crank, and a rear sprocket is mounted to the internal gear shift hub. A chain that is suspended around both the front and rear sprockets is disposed inside the support member. The support member is movably or swingably mounted to the frame. A cylindrical crank support portion that supports the crank mounting shaft via a pair of bearings protrudes from the front end portion of the support member. The cylindrical crank support portion is supported by the frame in a cantilevered manner.

In the conventional bicycle drive unit described above, because the support member is simply supported by the frame in the cantilevered manner via the crank support portion, it is difficult to maintain the rigidity of the entire drive unit at a high level.

On the other hand, a technology for motorizing gear shifting operations of a gear shift apparatus such as an internal gear shift hub has become widely used in recent years. When such a technology is used, because the support member is supported by the frame in the cantilevered manner in the conventional construction of the bicycle drive unit described above, the space inside the cantilevered support member is small. As a result, it is difficult to mount a gear positioning unit (an example of an electric driving mechanism) having a motor to electrically perform the gear shift operations of the gear shift apparatus or to mount a power supply device for providing electrical power to the gear positioning unit. Consequently, using the above conventional drive unit, it is difficult to accommodate motorization of the gear shift operations of the gear shift apparatus installed in the bicycle.

In view of the above, it will be apparent to those skilled in the art from this disclosure that there exists a need for an improved bicycle drive unit and bicycle chains stay. This invention addresses this need in the art as well as other needs, which will become apparent to those skilled in the art from this disclosure.

SUMMARY OF THE INVENTION

One object of the present invention is to provide a bicycle drive unit by which the overall rigidity can be maintained at a high level and that can easily accommodate motorization of the gear shift operations of the gear shift apparatus.

Another object of the present invention is to provide a bicycle chain stay by which the overall rigidity can be maintained at a high level and that can easily accommodate motorization of the gear shift operations of the gear shift apparatus.

In order to achieve the above objects and other objects of the present invention, a bicycle drive unit is provided that comprises a frame main unit, first and second cover members, a rear hub, a rear gear shift apparatus, an electric driving mechanism, a controller and a power supply unit. The frame main unit diverges from a front end portion toward first and second rear end portions with the front end portion having a movable mounting part configured and arranged to be movably coupled to a frame of a bicycle, and the first and second rear end portions having first and second hub mounting parts. The first and second cover members are coupled to transverse outer surfaces of the frame main unit such that a first space is formed between the first cover member and the frame main unit and a second space is formed between the second cover member and the frame main unit. The rear hub is disposed between the first and second hub mounting parts of the frame main unit. The rear hub comprises a hub axle, a hub shell, a drive cylinder and a rear sprocket. The hub axle is fixed between the first and second hub mounting parts of the frame main unit. The hub shell is rotatably coupled to the hub axle. The drive cylinder is coupled to one transverse end of the hub shell. The rear sprocket is fixed to the drive cylinder. The rear gear shift apparatus is configured and arranged to change rotational speed of the hub shell relative to an input force. The electric driving mechanism is disposed in the first space and linked to the rear gear shift apparatus to perform motorized gear shift operations of the rear gear shift apparatus. The controller disposed in one of the first and second spaces, and configured to control the electric driving mechanism. The power supply unit is disposed in one of the first and second spaces, and configured and arranged to provide electric power to the electric driving mechanism and the controller.

According to another aspect of the present invention, a bicycle chain stay is provided that comprises a frame main unit and an electric driving mechanism. The frame main unit diverges from a front end portion toward first and second rear end portions with the front end portion having a movable mounting part configured and arranged to be movably mounted to a frame of the bicycle, and the first and second rear end portions having first and second hub mounting parts, respectively, that are configured and arranged to be coupled to a rear wheel. The electric driving mechanism is mounted to the frame main unit to perform motorized gear shift operations of a bicycle gear shift apparatus.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
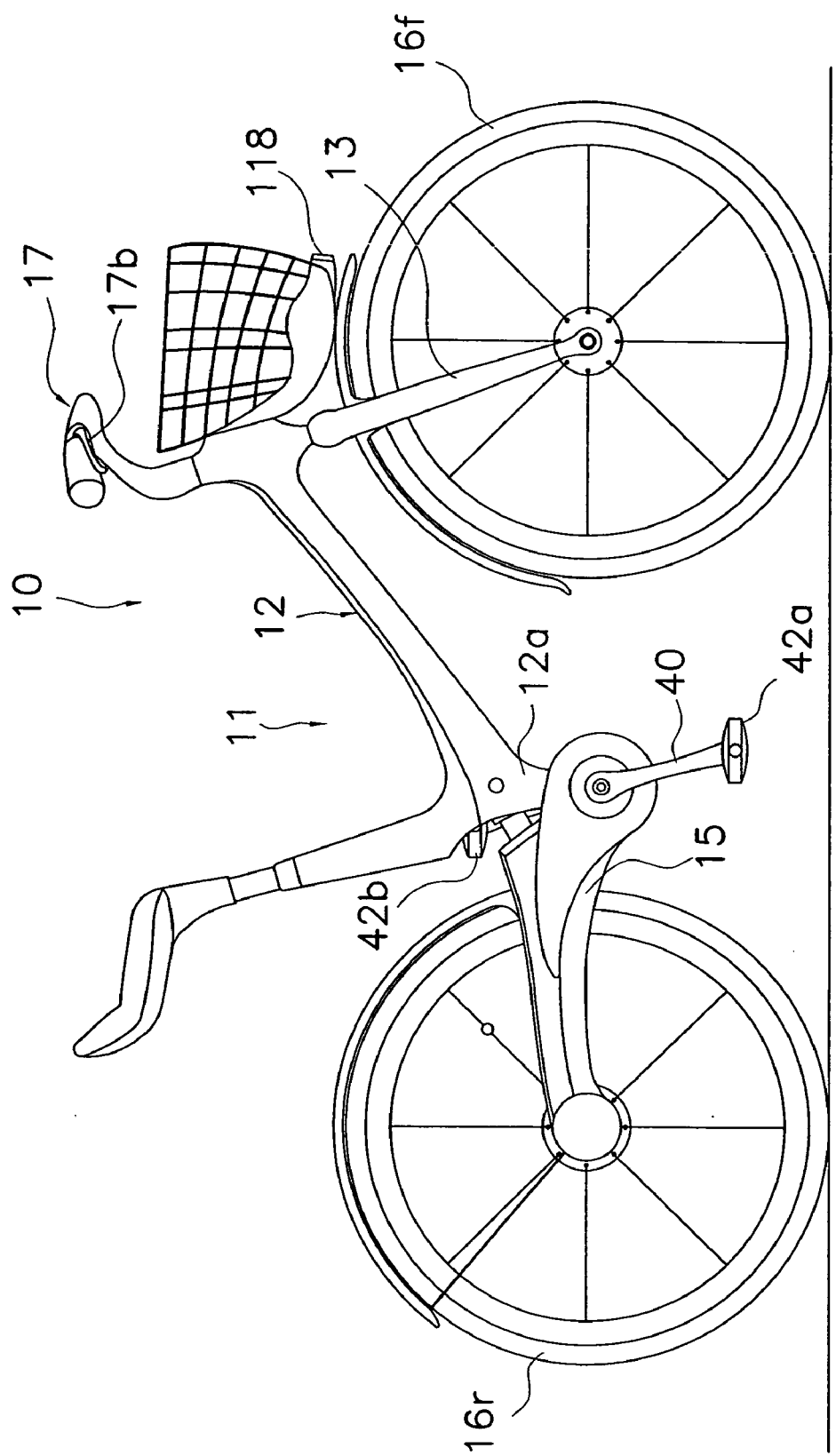
FIG. 1 is an overall right side elevational view of a bicycle provided with a drive unit in accordance with a preferred embodiment of the present invention.
Figure 2:
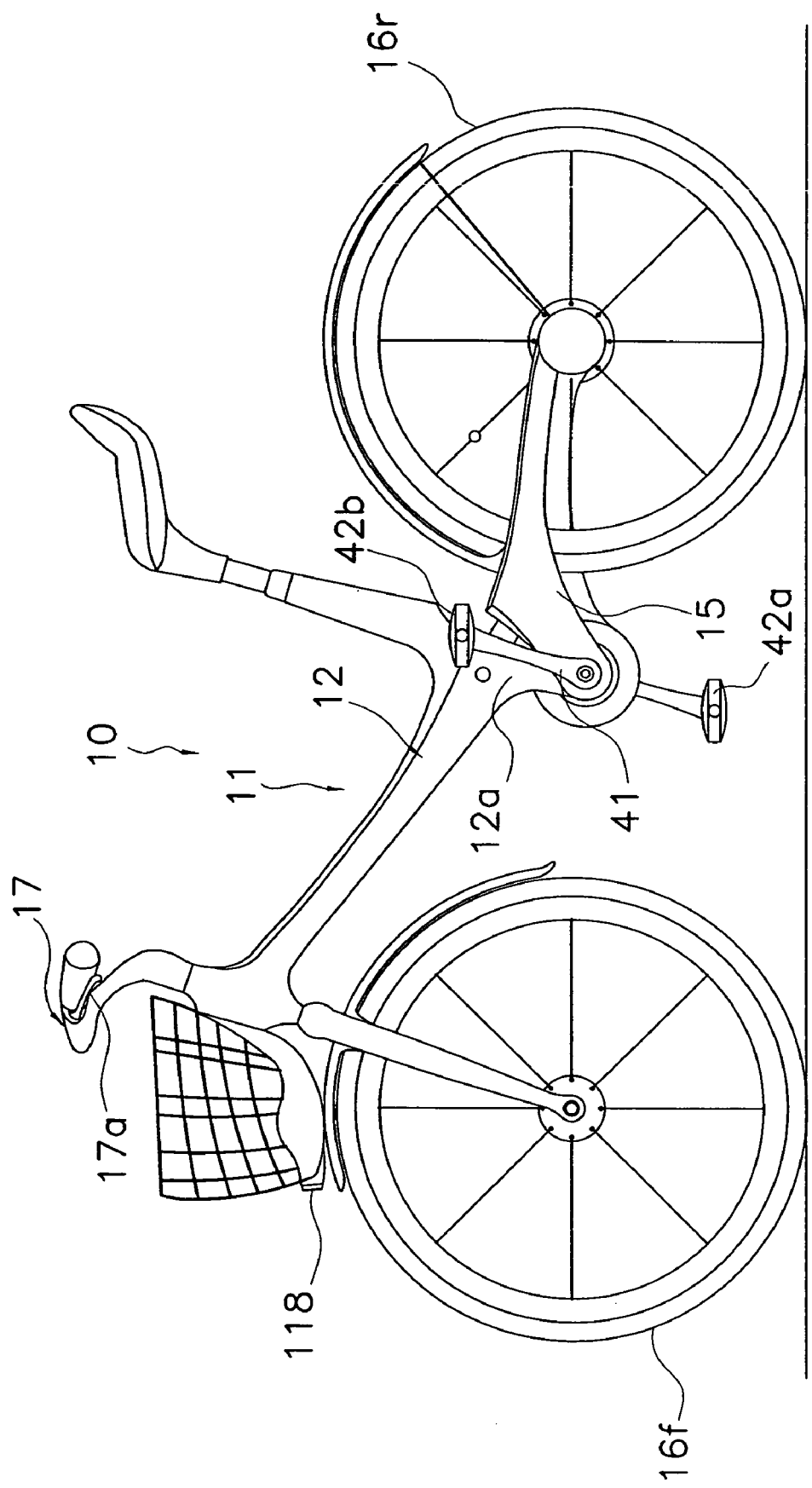
FIG. 2 is an overall left side elevational view of the bicycle provided with the drive unit illustrated in FIG. 1 in accordance with the preferred embodiment of the present invention is used.
Figure 3:
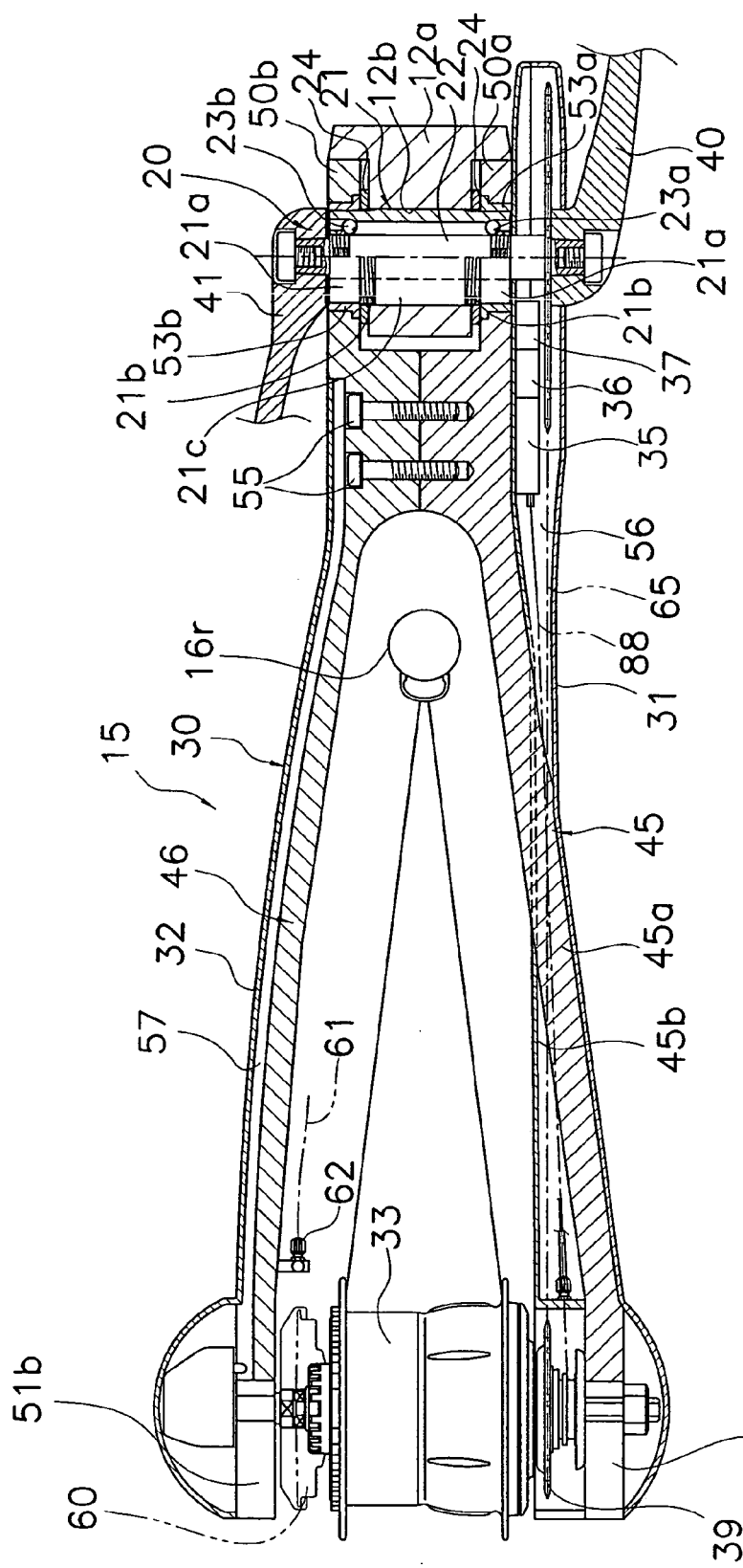
FIG. 3 is a schematic cross-sectional view for illustrating structural relationships between various components of the drive unit of the bicycle illustrated in FIGS. 1 and 2 in accordance with the preferred embodiment of the present invention.

Referring initially to FIGS. 1 and 2, a bicycle 10 with a drive unit 15 is illustrated in accordance with a preferred embodiment of the present invention. As seen in FIGS. 1 and 2, the bicycle 10 includes a frame 11 with a frame body 12 and a front fork 13. The frame body 12 is bent into a generally V-shape and. The bicycle 10 further includes the drive unit 15, a pair of front and rear wheels 16f and 16r, and a handlebar 17. The drive unit 15 is movably or swingably coupled to a rear bottom end portion of the frame body 12. The front wheel 16f is mounted between front bottom end portions of the front fork 13, and the rear wheel 16r is mounted between the rear end portions of the drive unit 15. The handlebar 17 is coupled to the top portion of the front fork 13. The frame body 12 has a hanger part 12a that protrudes downwardly from the bent part thereof. As best seen in FIG. 3, a crank mounting hole 12b is formed in the hanger part 12a which passes through the hanger part 12a in the transverse (left-right) direction (the vertical direction in FIG. 3). A crank mounting shaft assembly 20 is mounted in the crank mounting hole 12b.

As seen in FIG. 3, the crank mounting shaft assembly 20 has a sleeve 21 (cylindrical swing support part) that is non-rotatably mounted in the crank mounting hole 12b and a crank mounting shaft 22 that is rotatably mounted to the sleeve 21 via bearings 23a and 23b. A pair of small-diameter movable support parts 21a are formed at both axial end of the sleeve 21, and a pair of female screw parts 21b having a larger diameter than the movable support parts 21a are formed adjacent to the axial inner ends of the movable support parts 21a. Moreover, a securing part 21c having a further larger diameter than the screw female screw parts 21b is formed between the female screw parts 21b. Two lock nuts 24 are mounted to the screw parts 21b, whereby the sleeve 21 is non-rotatably secured to the hanger part 12a of the frame body 12. It is acceptable to provide a key groove or the like in the outer circumferential surface of the sleeve 21 to prevent the sleeve 21 from rotating by using a key. As seen in FIG. 3, a gear crank 40 having a front sprocket 38 is non-rotatably mounted to the right axial end (the bottom end in FIG. 3) of the crank mounting shaft 22. A left crank 41 is non-rotatably mounted to the left axial end (the top end in FIG. 3) of the crank mounting shaft 22. A pedal 42a or 42b is mounted to a free end portion of one of the cranks 40 and 41, respectively, as shown in FIGS. 1 and 2.

Figure 4:
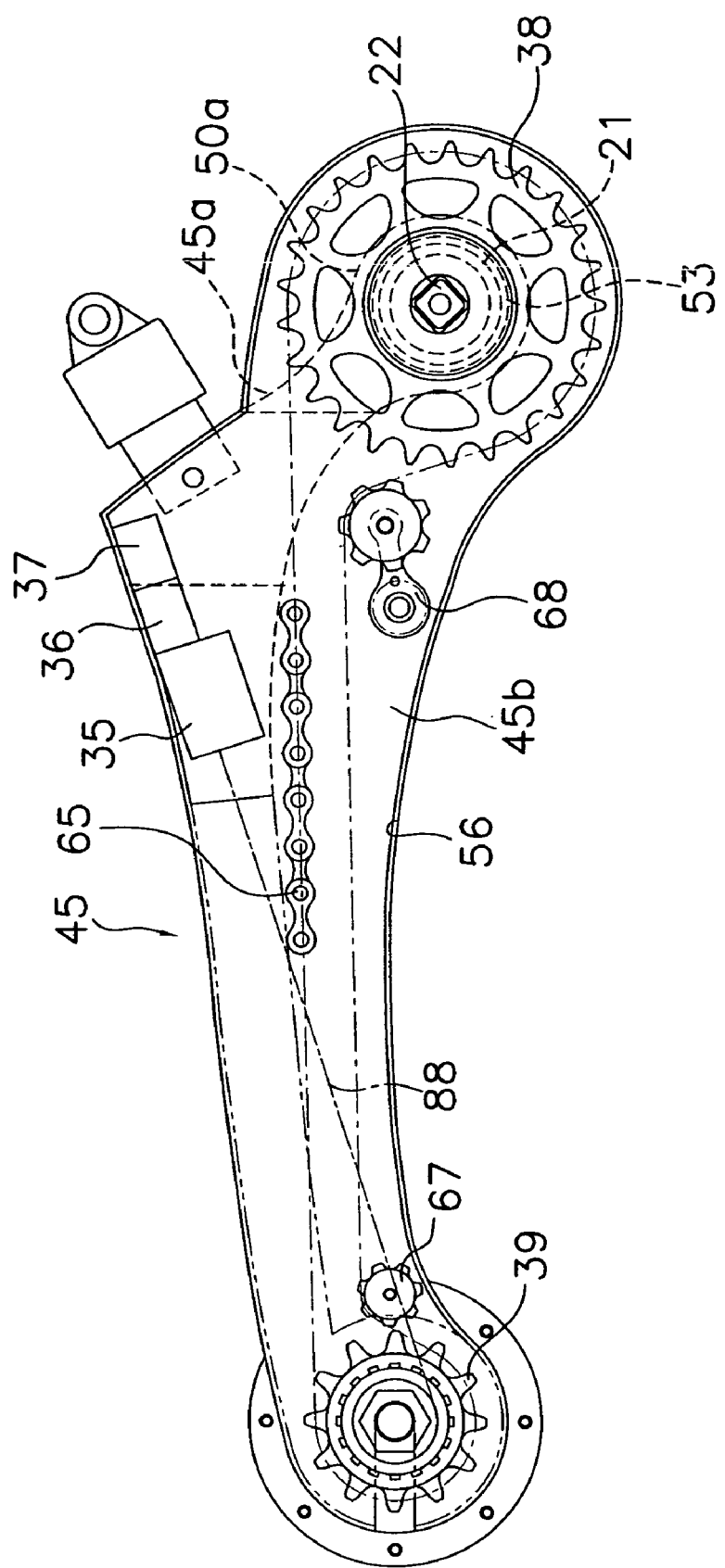
FIG. 4 is a right side elevational view of a first frame member of the drive unit with a first cover member removed in accordance with the preferred embodiment of the present invention.
Figure 5:
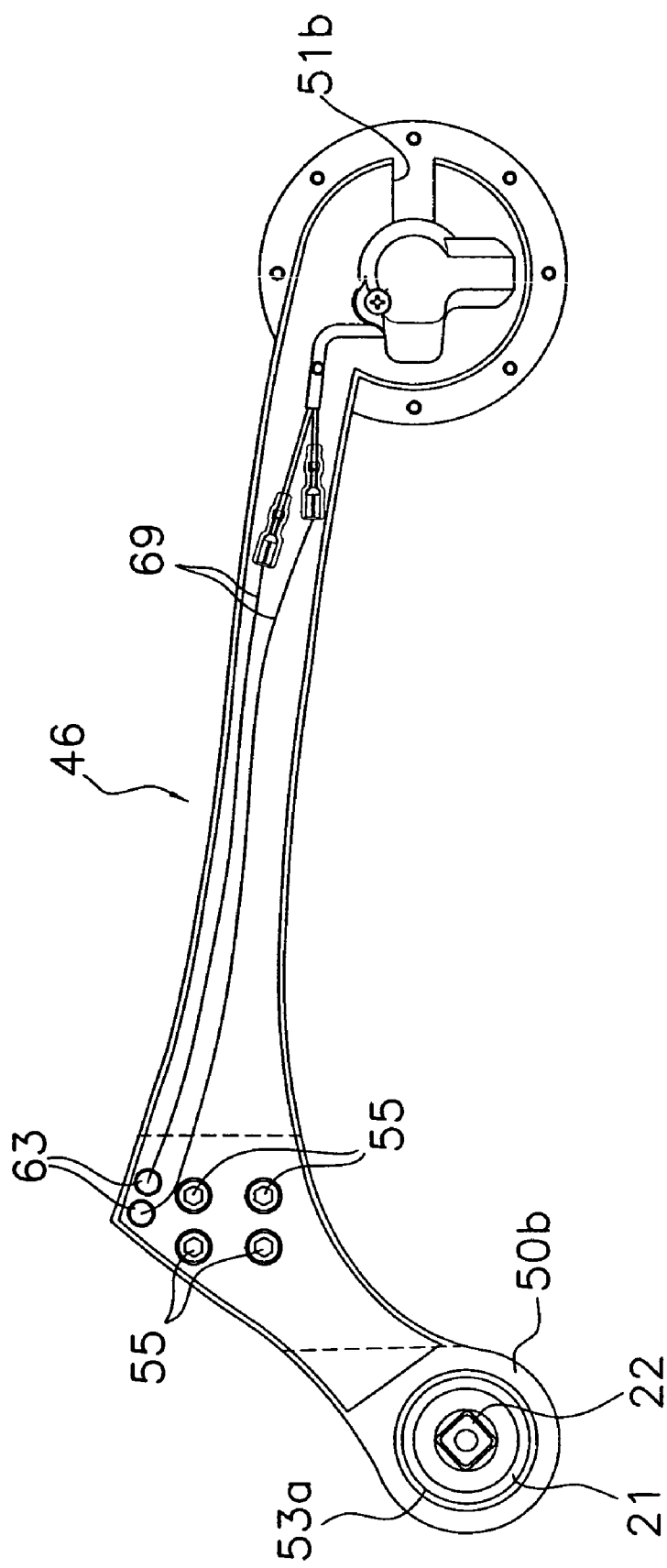
FIG. 5 is a left side elevational view of a second frame member of the drive unit with a second cover member removed in accordance with the preferred embodiment of the present invention.

As seen in FIGS. 3 to 5, the drive unit 15 of this embodiment basically comprises a frame main unit 30, first and second cover members 31 and 32, an integral gear shift hub 33, a gear positioning unit 35, a circuit unit 36, and a condenser element 37. The frame main unit 30 is movably mounted to the hanger part 12a of the frame body 12. The first and second cover members 31 and 32 are coupled to the transverse outer surfaces of the frame main unit 30. The internal gear shift hub 33 is mounted to the rear end portion of the frame main unit 30. The gear positioning unit 35 (an example of an electric driving mechanism) is configured and arranged to motorize the gear shift operations of the internal gear shift hub 33. The circuit unit 36 (an example of a controller) is configured to control the gear positioning unit 35. The condenser element 37 functions as a power supply device configured and arranged to supply electric power to the gear positioning unit 35 and the circuit unit 36.

The frame main unit 30 of the drive unit 15 comprises a first frame member 45 and the second frame member 46 that both extend over the entire longitudinal length of the frame main unit. The second frame member 46 is secured to the first frame member 45 by a pair of threaded securing bolts 55. The first and second frame members 45 and 46 are arranged such that the frame main unit 30 diverges or bifurcates into two separate portions (rear end portions of the first and second frame members 45 and 46) extending backward from the front end of the frame main unit 30 where the first and second frame members 45 and 46 are secured together. The first and second frame members 45 and 46 respectively have at the front end portions thereof first and second movable mounting parts 50a and 50b. The first and second movable mounting parts 50a and 50b are movably or swingably mounted to axial end portions of the sleeve 21 of the crank mounting shaft assembly 20 that is secured to the hanger part 12a of the frame body 12. Moreover, the first and second frame members 45 and 46 respectively include first and second hub mounting parts 51a and 51b on the rear end portions thereof. The first and second hub mounting parts 51a and 51b are arranged to sandwich the internal gear shift hub 33 therebetween, which is configured and arranged to be disposed in the center of the rear wheel 16r.

Figure 13:
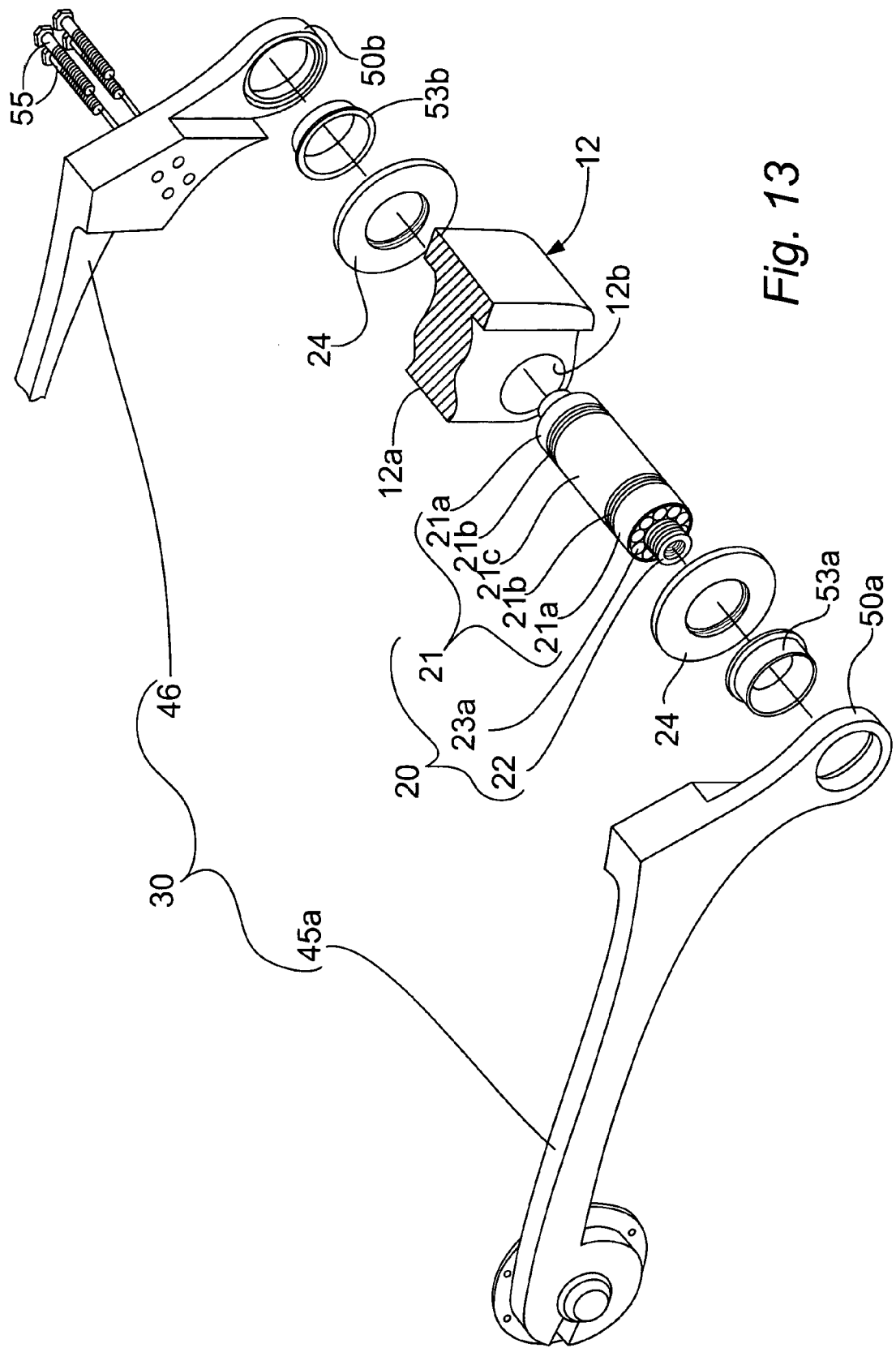
FIG. 13 is an exploded perspective view illustrating structural relationships between various components of the drive unit illustrated in FIGS. 3, 4 and 5 with some components removed to provide greater clarity in accordance with the first embodiment of the present invention.

As seen in FIG. 4, the first frame member 45 has a main frame member 45a disposed transversely opposite the second frame member 46 and an auxiliary frame member 45b that is arranged to form a first cavity or space 56 between the auxiliary frame member 45b and the first cover member 31. The main frame member 45a is shown in FIG. 13 along with second frame member 46 and other selected elements of the frame main unit 30, with the first and second cover members 31 and 32 and the auxiliary frame member 45b omitted to provide greater clarity. The first movable mounting part 50a is basically the front end portion of the main frame member 45a. The main frame member 45a is arranged to extend diagonally upward and rearward from the first movable mounting part 50a, and thereafter extend slightly diagonally downward and rearward in a side elevational view as seen in FIG. 4 and in the exploded perspective view FIG. 13. The first hub mounting part 51a is located at the rear end portion of the main frame member 45a in the form of a slot that extends from the rear end toward the front. As seen in FIG. 3, a bushing 53a with a flange or stopper is mounted within an aperture formed in the first movable mounting part 50a. The bushing 53a with flange comes into contact with the movable support part 21a of the sleeve 21. The auxiliary frame member 45b forms the first space 56 between the auxiliary frame member 45b and the first cover member 31, and the auxiliary frame member 45b also serves to close off the first space 56. The auxiliary frame member 45b has a side surface that is larger than the side surface of the main frame member 45a at the front end portion so that the first cover member 31 covers the front sprocket 38 at the front end of the auxiliary frame member 45b The second frame member 46 has a virtually axially symmetric configuration with the main frame member 45a of the first frame member 45 with respect to a traverse center line of the bicycle 10, as shown in FIGS. 3 and 5. The outer side surface of the second frame member 46 is caved in such that a second space 57 is formed between the second frame member 46 and the second cover member 32. Alternatively, the second space 57 can be formed by having the second cover member 32 bulge outward. A second movable mounting part 50b is basically the front end portion of the second frame member 46 as shown in FIGS. 3 and 13. The second frame member 46 is arranged to extend diagonally upward and rearward from the second movable mounting part 50b, and thereafter extend slightly diagonally downward and rearward. A second hub mounting part 51b is disposed at the rear end portion of the second frame member 46 in the form of a slit that extends from the rear end toward the front. A bushing 53b with a flange or stopper is mounted within an aperture formed in the second movable mounting part 50b as seen in FIG. 3 and indicated in FIG. 13. This bushing 53b with the flange is mounted to the movable support part 21b of the sleeve 21. As a result, the drive unit 15 is movably or swingably (pivotally) mounted to the frame body 12. An outer holder 62 (a brake cable engaging part) is mounted to the front inner surface of the second hub mounting part 51b of the second frame member 46. The outer holder 62 is used for mounting an outer casing of a brake cable 61 that operates a roller brake device 60 (hub brake mechanism). The roller brake device 60 comprises a hub brake as described below and is mounted to the internal gear shift hub 33. The brake cable 61 is connected to a pair of brake levers 17a and 17b mounted to the handlebar 17.

The first cover member 31 is screwed onto the auxiliary frame member 45b of the first frame member 45 to form the first space 56 between the first cover and the auxiliary frame member 45b as shown in FIGS. 3 and 4. The first space 56 is arranged to house the front sprocket 38, the rear sprocket 39 mounted to the internal gear shift hub 33, the gear positioning unit 35, the circuit unit 36, the condenser element 37, a tension pulley 66, a guide pulley 67 and the chain 65 suspended around the front and rear sprockets 38 and 39. As seen in FIG. 4, the tension pulley 68 is positioned near the front sprocket 38, and supplies tension to the chain 95. The guide pulley 67 is positioned near the rear sprocket 39, and guides the chain 65 inside the first cavity 56.

The second cover member 32 forms the second space 57 by covering the area formed by the depression or recess in the second frame member 46. The second space 57 preferably contains two electric wires 69 that electrically connect a generator mechanism 76 provided in the internal gear shift hub 33 (described below) with the condenser element 37 to supply the electric power output from the generator mechanism 76 to the condenser element 37. The electric wires 69 are connected to the condenser element 37 via the circuit unit 36 disposed inside the first space 56 after passing through through-holes 63 (FIG. 5) arranged to provide communication between the second space 57 and the first space 56.

Figure 6:
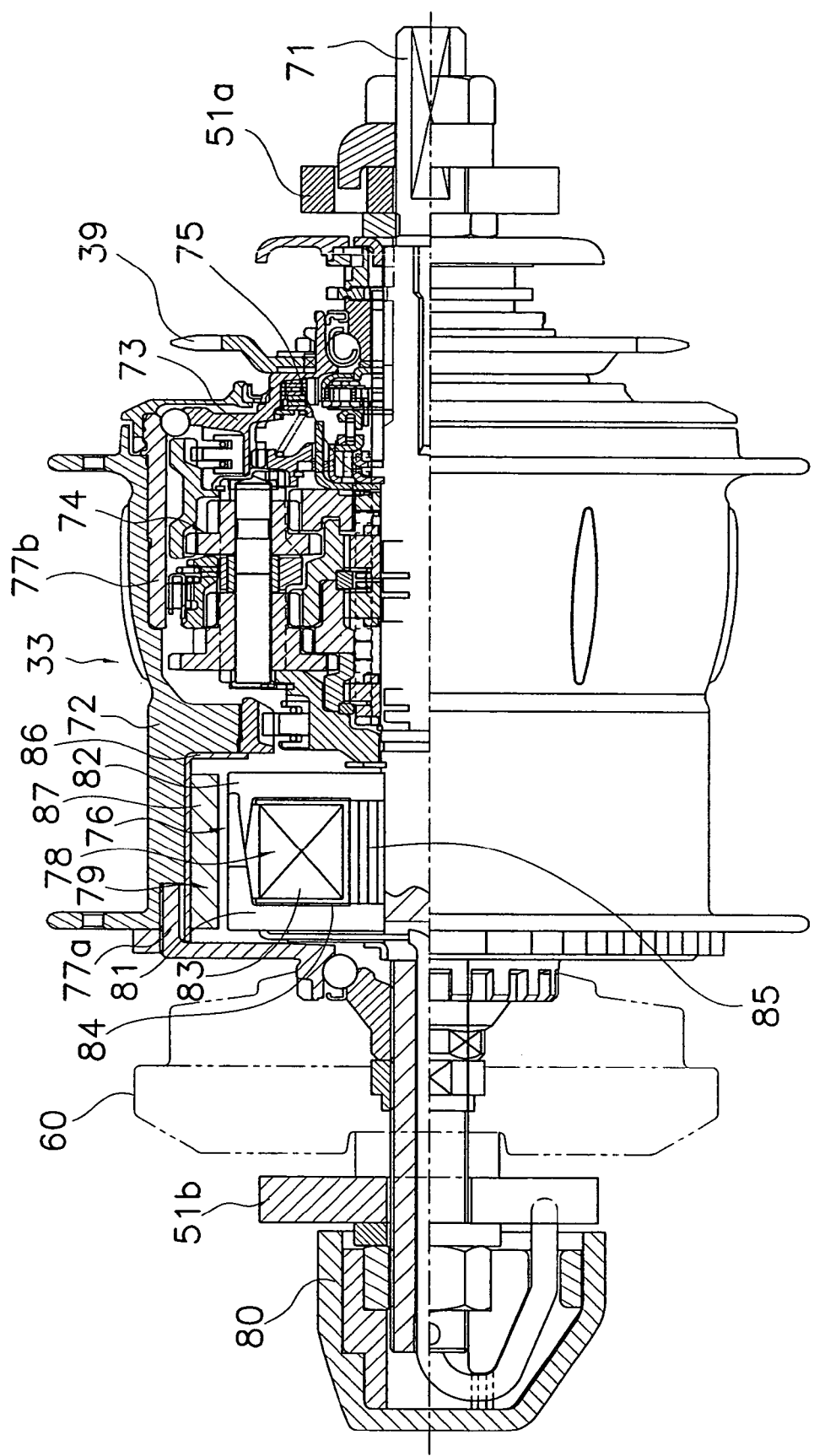
FIG. 6 is a partial cross-sectional view of an internal gear shift hub of the drive unit in accordance with the preferred embodiment of the present invention.

The internal gear shift hub 33 is configured and arranged to perform the functions of a rear hub and a rear gear shift apparatus. As seen in FIG. 6, the internal gear shift hub 33 as the rear hub comprises a hub axle 71, a hub shell 72, a drive cylinder 73 and the rear sprocket 39. The hub axle is non-rotatably mounted between the first and second hub mounting parts 51a and 51b of the frame main unit 30. The hub shell 72 is rotatably mounted to the hub axle 71. The drive cylinder 73 is connected to one axial end of the hub shell 72 as seen in FIG. 6. The rear sprocket 39 is non-rotatably mounted to the drive cylinder 73. The hub shell 72 is rotatably supported around the hub axle 71 by left and right sleeves 77a and 77b mounted to axial end portions of the hub axle 71. The roller brake device 60 is configured and arranged to be mounted to the outer circumference of the sleeve 77a.

Moreover, the internal gear shift hub 33 as the rear gear shift apparatus comprises a force transmission mechanism 74 and a switching mechanism 75. The force transmission mechanism 74 is arranged to transmit rotation of the drive cylinder 73 to the hub shell 72 via one of a plurality of force transmission paths. The switching mechanism 75 is arranged to selectively switch among the plurality of force transmission paths. In this embodiment, the internal gear shift hub 33 that functions as the rear gear shift apparatus has, for example, eight force transmission paths such that the rotation of the crank mounting shaft 22 caused by the pedals 42a and 42b can be selectively converted into eight different gears.

Furthermore, as mentioned above, the internal gear shift hub 33 also includes the generator mechanism 76 that is aligned with the force transmission mechanism 74 as seen in FIG. 6. The generator mechanism 76 is configured and arranged to generate electric power using the relative rotation between the hub shell 72 and the hub axle 71 and supply the generated power to the power supply device such as the condenser element 37. The generator mechanism 76 basically comprises an internal stator 78 and an external rotor 79, as shown in FIG. 6. The electric power generated by the generator element 76 can be drawn from a connector 80.

The internal stator 78 basically comprises two stator yokes 81 and 82, a bobbin 84, and a cylindrical core yoke 85. A coil 83 is winded around the bobbin 84. The stator yokes 81 and 82, the bobbin 84 and the cylindrical core yoke 85 preferably form a single integral unit when they are assembled together, which constitutes the internal stator 78. The internal stator 78 is secured to the hub axle 71 as seen in FIG. 6.

The external rotor 79 basically comprises a cap member 86 and a permanent magnet unit 87. The cap member 86 is secured to the hub shell 72. The cap member 86 and the permanent magnet unit 87 are preferably formed as a single, integral unit. This integrally formed external rotor 79 is fitted and secured to the inner circumferential surface of the hub shell 72 as seen in FIG. 6.

The permanent magnet unit 87 preferably comprises four magnets that are disposed at equal intervals in the inner circumferential surface of the hub shell 72 as the magnets being fixedly coupled to the circumferential surface of the cap member 86. The permanent magnet unit 87 has alternating N and S poles disposed at equal intervals, such that a total of 28 poles faces the stator yoke 81 or 82.

The operation to generate electrical power using the generator mechanism 76 in the internal gear shift hub 33 will now be explained.

When the hub shell 72 rotates relative to the hub axle 71 as the bicycle 10 is driven, the external rotor 79 that is fixed to the inner circumferential surface of the hub shell 72 rotates relative to the internal stator 78 fixed to the hub axle 71. Thus, the permanent magnet unit 87 rotates around the outside of the stator yokes 81 and 82. As a result, when the stator yoke 81 receives N-pole magnetic flux from the permanent magnet unit 87, the stator yoke 82 receives S-pole magnetic flux, and when the stator yoke 81 receives S-pole magnetic flux from the permanent magnet unit 87, the stator yoke 82 receives N-pole magnetic flux. In other words, due to the rotation of the permanent magnet unit 87 around the outside of the stator yokes 81 and 82, a first state in which the stator yoke 81 is an S-pole and the stator yoke 82 is an N-pole and a second state in which the stator yoke 81 is an N-pole and the stator yoke 82 is an S-pole are repeated in turn. Therefore, alternating magnetic flux that runs in the hub axial direction occurs in the cylindrical core yoke 85 that magnetically links the stator yokes 81 and 82. Due to this alternating magnetic flux occurring in the cylindrical core yoke 85 disposed inside of the coil 83, electric current is generated in the coil 83, whereby electric power is generated. By supplying the generated electric power from the connector 80 to the gear positioning unit 35 via the condenser element 37 and the circuit unit 36 through electric wiring 69, motorized gear shifting of the internal gear shift hub 33 can be achieved.

Figure 7:
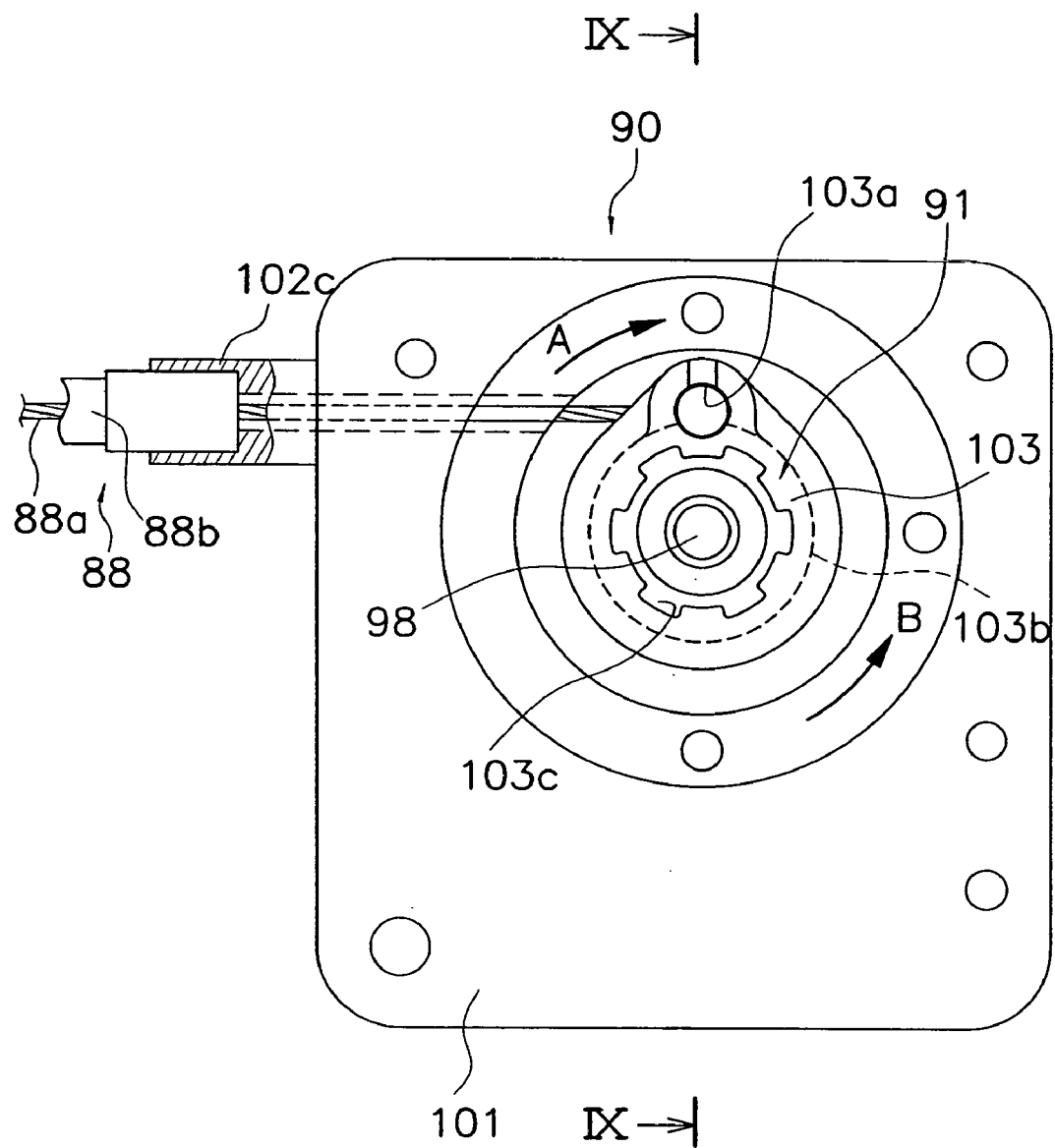
FIG. 7 is a plan view of a gear positioning unit disposed in the drive unit with some components are partially shown in cross section in accordance with the preferred embodiment of the present invention.
Figure 8:
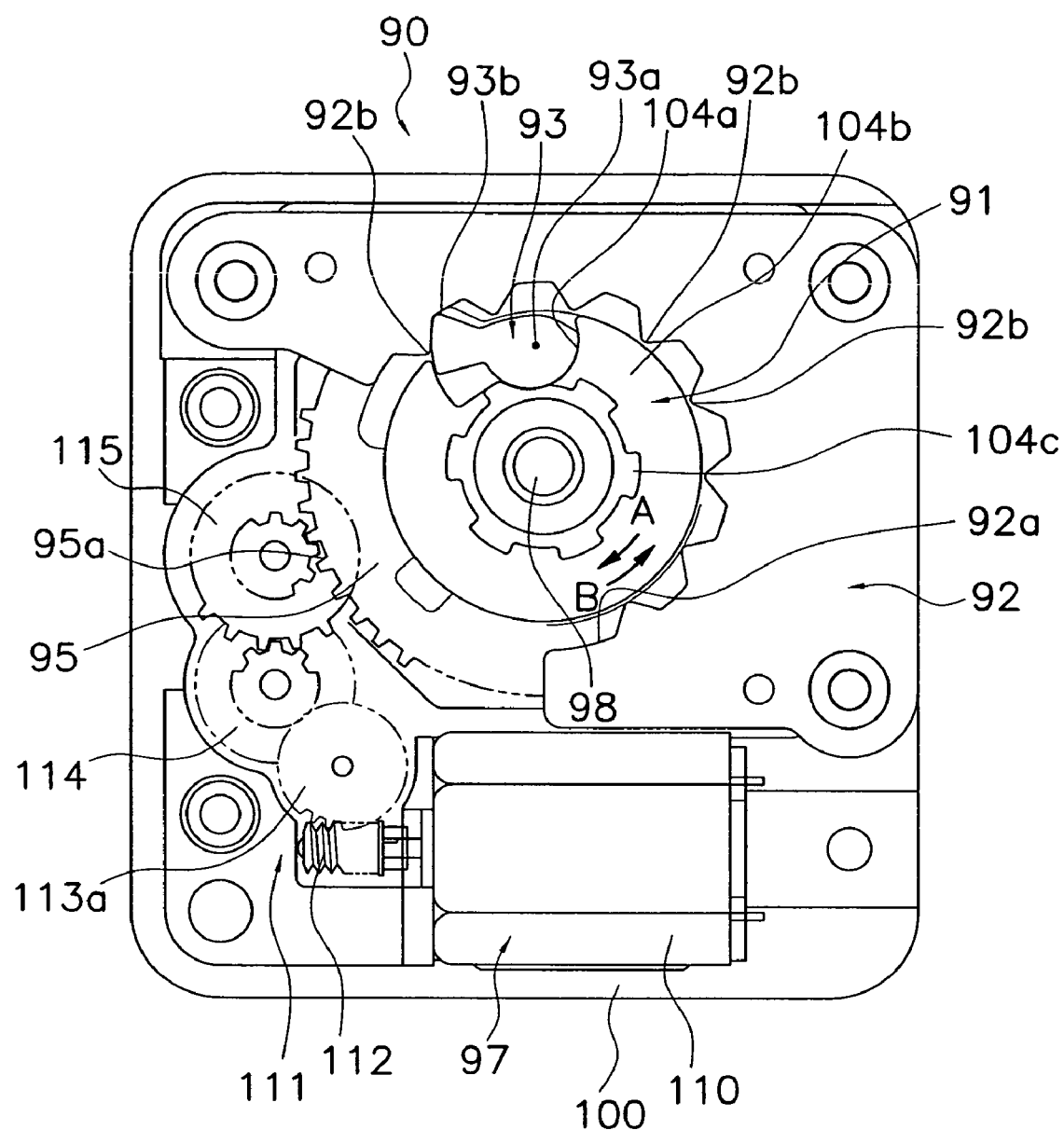
FIG. 8 is a plan view of the gear positioning unit illustrated in FIG. 7 with a second case member opened in accordance with the preferred embodiment of the present invention.
Figure 9:
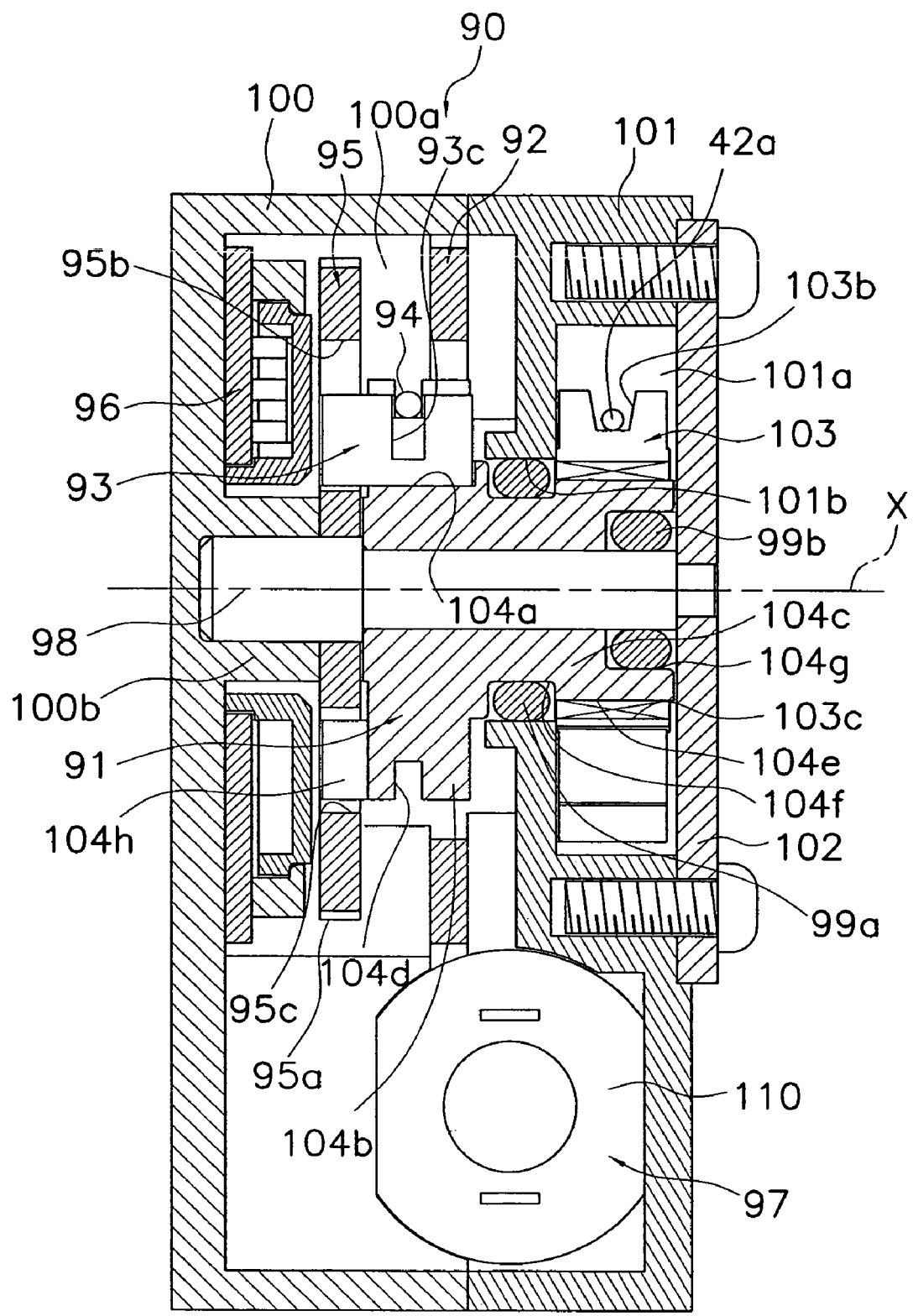
FIG. 9 is a cross-sectional view of the gear positioning unit illustrated in FIGS. 7 and 8 as taken along a section line IX—IX in FIG. 7 in accordance with the preferred embodiment of the present invention.

Referring now to FIGS. 7 to 9, the gear positioning unit 35 is arranged as a unit that positions the internal gear shift hub 33 via a gear shift cable 88 in accordance with the active gear. The gear positioning unit 35 is linked to the internal gear shift hub 33 having eight gears via the gear shift cable 88. The gear positioning unit 35 basically comprises a case 90, a spool unit 91, a positioning member 92, a claw member 93, an annular spring member 94, a claw release member 95, a gear position sensor (not shown), and an electric driver 97. The case 90 is mounted inside the first space 56 formed between the first frame member 45 and the first cover member 31. The spool unit 91 is rotatably mounted around a first axis X (FIG. 9) in the case 90. The positioning member 92 is secured to the case 90. The claw member 93 is movably mounted such that the claw member 93 can be engaged with and detached from the spool unit 91. The annular spring member 94 is configured and arranged to apply force to the claw member 93 in the direction of engagement with the spool unit 91. The claw release member 95 is configured and arranged to push the claw member 93 to the released position. The gear position sensor is configured and arranged to detect the gear position. The electric driver 97 is configured and arranged to drive the claw release member 95.

The case 90 has a first case member 100, a second case member 101 that is screwed onto the first case member 100, and a cover member 102 that is screwed onto the second case member 101.

The first case member 100 is a box shape member having a rectangular first housing cavity 100a as one surface of the first case member 100 being open. A boss portion 100b is formed at the bottom of the first case member 100 as seen in FIG. 9. The base end of a rotating shaft 98 that rotatably supports the spool unit 91 and the claw release member 95 is non-rotatably secured to the boss portion 100b. The proximal end of the rotating shaft 98 is supported by the cover member 102.

The second case member 101 is formed such that the second case member 101 closes off the first housing cavity 100a of the first case member 100, and a cylindrical second housing cavity 101a that houses a part of the spool unit 91 is formed on the surface of the second case member 101. The electric motor 110 of the electric driver 97 is mounted on the side of the second case member 101 which faces the first housing cavity 100a. A round opening 101b that extends through to the first housing cavity 100a is formed in the center of the second housing cavity 101a as seen in FIG. 9. Furthermore, an outer engaging piece 101c that engages with an outer casing 88b of the gear shift cable 88 is formed to protrude from the side surface of the second case member 101.

The spool unit 91 has a cable spool 103 with a cable engaging part 103a that engages with the proximal end of an inner cable 88a of the gear shift cable 88, and a claw mounting part 104 that is non-rotatably coupled to the cable spool 103. The cable spool 103 is a generally raindrop-shaped cylindrical member made of, for example, synthetic resin. The cable spool 103 is non-rotatably coupled to the claw mounting part 104 and partially protrudes in the radial direction. The protruding portion of the cable engaging part 103a has a round hole that engages with a cylindrical drum 88c that is secured to the proximal end of the inner cable

88*a*. A spooling groove 103*b* around which the inner cable 88*a* is wound is formed on the outer circumferential surface of the cable spool 103. A plurality of spline grooves 103*c* that are non-rotatably connected to the claw mounting part 104 are formed on the inner circumferential surface of the cable spool 103.

The rotating shaft 98 passes through the center of the claw mounting part 104 comprising a cylindrical metal member that is housed in the first housing cavity 100*a*. The claw mounting part 104 has a recess portion 104*a*, a large-diameter portion 104*b* and a small-diameter shaft 104*c*. The recess portion 104*a* is formed on the outer circumferential surface of the large-diameter portion 104*b*. The recess portion 104*a* is configured and arranged to movably house the claw member 93. The small-diameter shaft 104*c* extends from the large-diameter portion 104*b* toward the cable spool 103. An annular groove 94*d* to which the annular spring member 94 is mounted is formed on the outer circumferential surface of the large-diameter portion 104*b*. In addition, a linking pin 104*h* (see FIG. 9) used for rotation in the cable spooling direction in linkage with the claw release member 95 protrudes from the end of the large diameter portion 104*b* toward the claw release member 95.

The shaft 104*c* passes through the opening 101*b* formed in the second case member 101 and extends into the second housing cavity 101*a*. A plurality of spline grooves 104*e* that engage with the spline grooves 103*c* of the cable spool 103, as well as a an annular groove 104*f* to which a waterproofing O-ring 99*a* is mounted, are formed side by side on the outer circumferential surface of the proximal end of the shaft 104*c*. Furthermore, an annular recess 104*g* used for mounting of an O-ring 99*b* is formed on the proximal end surface of the shaft 104*c*. The O-ring 99*a* seals the gap between the opening 101*b* of the second case member 101 and the claw mounting part 104, and prevents moisture from entering the first housing cavity 100*a* from the second housing cavity 101*a*. The O-ring 99*b* seals the gap between the claw mounting part 104 and the rotating shaft 98, and prevents moisture from entering the first housing cavity 100*a* from the outside.

The positioning member 92 is configured and arranged to position the spool unit 91 at one of the eight gear positions via the claw member 93. This in turn positions the gear shift cable 88 at one of the eight gear positions. The positioning member 92 is a metal plate having a generally rectangular shape, and has a round positioning opening 92*a* formed in the center thereof and eight protrusions 92*b* formed to protrude from the positioning member 92 into the positioning opening 92*a*. The eight protrusions 92*b* are disposed at equal intervals along the rotational direction in accordance with the gear positions of the eight gears of the internal gear shift hub 33.

The claw member 93 is preferably a metal member that moves to an engaging position at which the proximal end 93*b* moves in the radial outward direction and engages with one of the eight protrusions 92*b* or a release position at which the proximal end 93*b* moves radially inward and detaches from one of the eight protrusions 92*b*. The claw member 93 is disposed such that it, together with the positioning member 92, permits rotation of the spool unit 91 in the cable spooling direction A and prohibits rotation in the cable supply direction B shown in FIG. 8. In other words, when the claw member 93 is movably mounted to the depression 104*a* formed in the claw mounting part 104 of the spool unit 91, the movement fulcrum 103*a* is disposed further downstream in terms of the cable spooling direction A than the proximal end 103*b* of the claw member 103. As a result, when the claw member 103 rotates in the cable spooling direction A and comes into contact with a protrusion 102*b*, the claw member 103 is pushed to the release position. Conversely, when the claw member 103 rotates in the cable supply direction B, the claw member 103 engages with a protrusion 92*b* and further rotation of the spool unit 91 is prohibited.

A groove 93*c* that engages with the annular spring member 94 is mounted is formed on the outer circumferential surface of the claw member 93 along the rotational direction. The proximal end 93*a* of the claw member 93 can come into contact with the positioning member 92 and the claw release member 95 at points thereof across the groove 93*c* with a gap in between along the first axis X direction.

The annular spring member 94 is preferably a metal spring member that is mounted in the annular groove 104*d* and the groove 93*c* in the pulled state. As a result, a contracting force arises in the annular spring member 94. Using this force, the claw member 93 is forced toward the engaging position. When force is applied to the claw member 93 by this annular spring member 94, it is easy to apply force to the claw member 93, and the amount of space required in the first axis X direction to house the spring is minimal.

The claw release member 95 is a disk-shaped metal member on the outer circumference of which are formed gear teeth 95*a* that engage with the electric driver 97. The claw release member 95 is rotatably mounted to the rotating shaft 98 adjacent to the spool unit 91.

The electric driver 97 has an electric motor 110 used for driving and a reduction mechanism 111 that is configured and arranged to slow down the rotation of the electric motor 110, as shown in FIG. 8. The electric motor 110 is, for example, a DC motor.

The reduction mechanism 111 includes a first reduction gear unit 113, a second reduction gear unit 114 and a third reduction gear unit 115. The first reduction gear unit 113 includes a worm gear 112 that is secured to the output shaft of the electric motor 110 and a worm wheel 113*a* that engages with the worm gear 112. The second reduction gear unit 114 engages with the first reduction gear unit 113. The third reduction gear unit 115 engages with the second reduction gear unit 114. Each of the reduction gear units 113, 114 and 115 has a large-diameter gear and a small-diameter gear, and gear reduction is carried out through the engagement of a small-diameter gear with the large-diameter gear of a different reduction gear unit. The small gear of the third reduction gear unit 115 engages with the gear unit 95*a* formed on the outer circumference of the claw release member 95. The rotation of the electric motor 110 is reduced to $\frac{1}{1500}$, for example, by this reduction mechanism 111.

The gear positioning unit 35 having this construction can motorize the gear shift operations of the internal gear shift hub 33 by positioning the rotation of the spool unit 91 via the electric motor 110.

Figure 10:
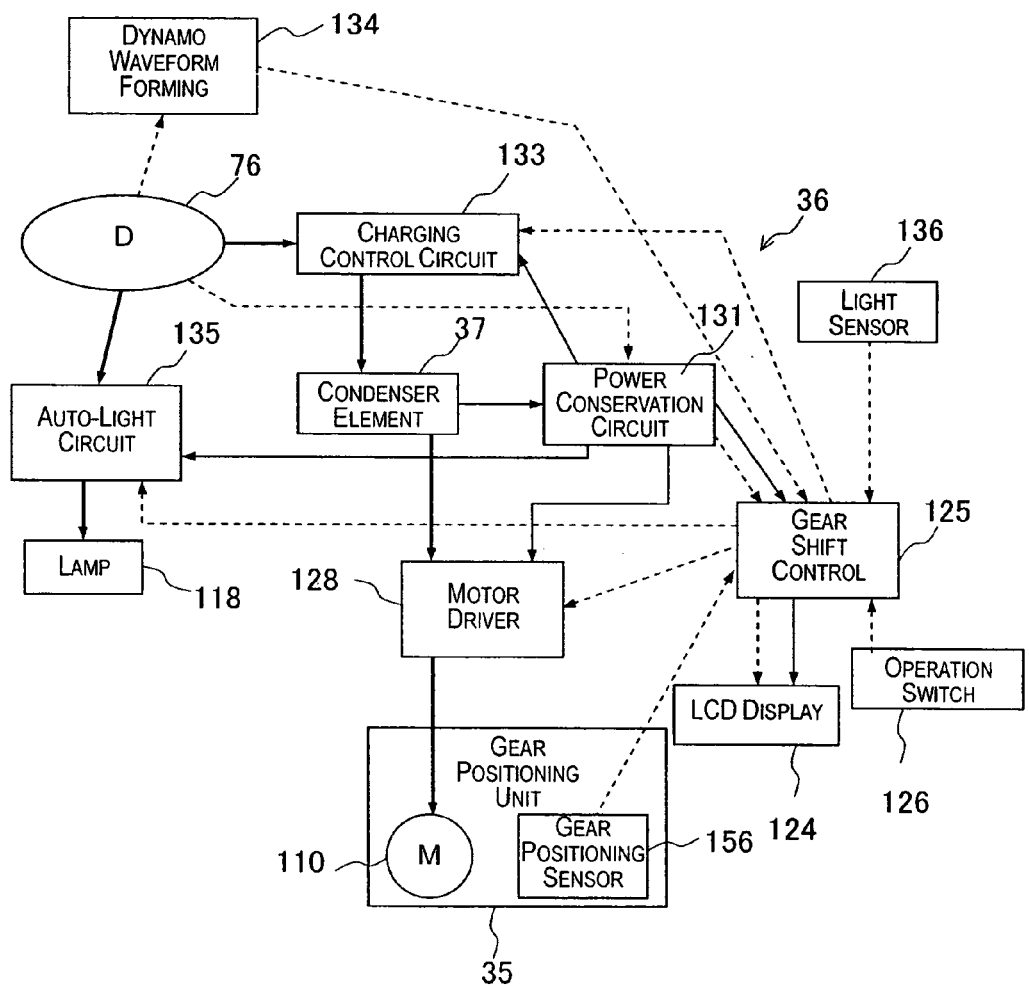
FIG. 10 is a block diagram for illustrating a configuration of a circuit unit utilized in the drive unit in accordance with the preferred embodiment of the present invention.

As seen in FIG. 10, the circuit unit 36 has a gear shift controller 125 that includes a microcomputer comprising a CPU, RAM, ROM and I/O interface. The bold lines in FIG. 10 indicate the flow of 1 A current, for example, the solid lines indicate the flow of 5 mA current, and the broken lines indicate signal lines.

The gear shift controller 125 is configured to carry out automatic gear shift control of the internal gear shift hub 33 in accordance with the speed based on the operation of the operation switch 126 of a gear shift operation unit (not shown) mounted to the handlebar 17. Also, the gear shift controller 125 is configured to perform display control of an LCD display 124 disposed on the gear shift operation unit. Moreover, the gear shift controller 125 is configured to perform lamp control to illuminate a lamp 118 mounted to the front basket of the bicycle 10 when the ambient brightness falls to a prescribed level or below and extinguish the lamp 118 when the prescribed brightness level is exceeded. The gear shift controller 125 is connected to the operation switch 126 disposed on the gear shift operation unit of the bicycle 10, the LCD display 124, an light sensor 136 that serves as an illumination sensor for the control of the lamp 118, and a dynamo waveform creating circuit 134 that generates speed signals based on the output from an AC dynamo 119. The gear shift controller 125 is further connected via a power conservation circuit 131 to a charging control circuit 133, the condenser element 37 and an auto-light circuit 135. Furthermore, a motor driver 128, gear position sensor 156 disposed on the gear positioning unit 35 and other I/O units are also connected to the gear shift controller 125.

The current speed of the bicycle 10, as well as the selected gear during gear shifting, are displayed on the LCD display 124.

The power conservation circuit 131 is configured to minimize the consumption of power when the bicycle 10 is stopped. Power stored in the condenser element 37 is supplied to the power conservation circuit 131. The power conservation circuit 131 is connected to the gear shift controller 125, the motor driver 128, the charging control circuit 133 and the auto-light circuit 135. The power conservation circuit 131 is configured to supply the power stored in the condenser element 37 to these components during bicycle operation and terminate such supply when the bicycle 10 is stopped. Signals from the generator mechanism 76 are input to the power conservation circuit 131, from which it is determined whether or not the bicycle 10 is stopped. The power conservation circuit 131 enables wasteful consumption of the power stored in the condenser element 37 to be minimized.

The condenser element 37 preferably comprises a large-capacity condenser such as an electric double layer condenser, for example, and stores DC power that is output from the generator mechanism 76 and rectified by the charging control circuit 133. The 1 mA current that is accumulated in the condenser element 37 is supplied to the gear shift controller 125, motor driver 128, charging control circuit 133 and auto-light circuit 135 via the power conservation circuit 131. The 1 A current stored in the condenser element 37 is also supplied directly to the motor driver 128. The condenser element 37 may also comprise a secondary battery such as a nickel-cadmium battery, a lithium ion battery or a nickel-hydrogen battery instead of a condenser.

The motor driver 128 is configured to control the positioning of the electric motor 110. The motor driver 128 runs on the 1 mA current supplied from the power conservation circuit 131, and the 1 A current supplied from the condenser element 37 is controlled and sent to the electric motor 110 for positioning thereof.

The charging control circuit 133 comprises a half-wave rectification circuit, for example, that is configured to rectify the AC current output from the generator mechanism 76 to 1 A and 5 mA DC current, for example.

The dynamo half-wave forming circuit 134 is configured to generate speed signals from the AC current output from the generator mechanism 76. In other words, the dynamo half-wave forming circuit 134 is configured to extract sine curve AC signals at half-cycle periods, pass them through an appropriate waveform forming circuit such as a Schmitt circuit, and generate pulse signals corresponding to the speed. Thus, the dynamo half-wave forming circuit 134 is configured and arranged to function as a speed sensor that detects the rotational speed of the rear wheel 16r.

The auto-light circuit 135 runs according to ON/OFF signals output by the gear shift controller 125 based on the detection signal output from the light sensor 136. The auto-light circuit 135 is configured to supply or terminate the supply of 1 A current output from the generator mechanism 76 based on the ON/OFF signals output by the gear shift controller 125. As a result, the lamp 118 is automatically illuminated when the ambient brightness falls to or below a prescribed level, and is extinguished when the prescribed brightness is exceeded.

Using the gear shift controller 125 having the above construction, the internal gear shift hub 33 undergoes gear shift control in automatic gear shift mode or manual gear shift mode, depending on the mode selected using the gear shift operation unit. Specifically, if automatic gear shift mode is selected, for example, gear shift control for eight gears can be performed in accordance with the bicycle speed. Furthermore, gear shift control may also be executed based on operation of the gear shift operation unit. In addition, a wire terminal for connecting to the gear shift operation unit is disposed in the circuit unit 36.

When the bicycle wheels 16f and 16r are revolving, the wheel movement is detected by the power conservation circuit 131 and electric power for control operations is supplied to the gear shift controller 125, the charging control circuit 133 and the like. As a result, the gear shift controller 125 begins operating and control is executed over the LCD display 124, the motor driver 128, the auto-light circuit 135 and the charging control circuit 133. The condenser element 37 is then charged by the power generated by the generator mechanism 76. Furthermore, bicycle speed signals are supplied to the gear shift controller 125 from the dynamo waveform forming circuit 134. When the bicycle wheels 16f and 16r stops moving, the power conservation circuit 131 detects the stop and terminates the supply of power for control. Therefore, power is no longer consumed wastefully when the bicycle 10 is stopped. Consequently, the condenser element 37 is not consumed when the bicycle is stopped.

Because the condenser element 37 stores the power generated by the generator mechanism 76 and the stored power is used to operate the various components including the gear shift controller 125, there is no need to charge or replace a battery. Moreover, there is no need to monitor remaining battery capacity or carry a spare battery, so that gear shift control can be executed without having to perform troublesome operations regarding the power supply.

Furthermore, the bicycle speed is detected based on AC signals output from the generator mechanism 76 and gear shift control is performed based on the detected bicycle speed. Because the AC generator comprising the generator mechanism 76 generally has multiple poles, AC signals comprising wavelengths related to the number of such poles and the bicycle speed are output by the AC generator. As a result, more pulse signals per rotation can be achieved from AC signals than the number of speed signals that can be obtained from a speed sensor that detects a magnet mounted to the bicycle wheel. Therefore, the bicycle speed can be detected with more precision during one rotation, thereby enabling more accurate gear shift control to be executed in real time. Because control is performed based on AC signals from the generator mechanism 76, gear shift control can be carried out within the drive unit 15.

Furthermore, the electric power from the generator mechanism 76 that is not used during the daytime in the conventional art can be effectively used.

In addition, because the gear positioning unit 35 is reduced in thickness, it can be disposed in the first cavity 56 adjacent to the circuit unit 36 and the condenser element 37. As a result, because the power from the generator mechanism 76 can be used as a power supply for the circuit unit 36 and the electric motor 70, and the gear positioning unit 35 is reduced in thickness, automatic bicycle shifting can be realized using a compact and lightweight construction.

Moreover, because the internal gear shift hub 33 mounted to the rear wheel 16*r* is supported at both ends and not in a cantilevered manner, the rigidity of the frame main unit 30 can be maintained at a high level. Furthermore, because the gear positioning unit 35 that enables motorization of the gear shift operations of the internal gear shift hub 33 is disposed in the first cavity 56, and both the controller that controls the gear positioning unit 35 and the power supply for the electric driving mechanism and the controller are disposed in the first cavity 56, it is easy to enable motorization of the gear shift operations of the internal gear shift hub 33.

Alternative embodiments of the present invention will be explained.

(a) In the above explained embodiment of the present invention, the rear gear shift hub 33 was an internal gear shift hub, but the present invention may be equally applied in connection with an external gear shift hub having a derailleur and multiple gears.

(b) In the above explained embodiment, the frame main unit 30 was movably connected to the frame body 12 such that the frame main unit 30 could move in the area around the crank mounting shaft 22. Alternatively, the frame main unit 30 can be arranged so that the frame main unit 30 moves at a location other than the crank mounting shaft 22.

Figure 11:
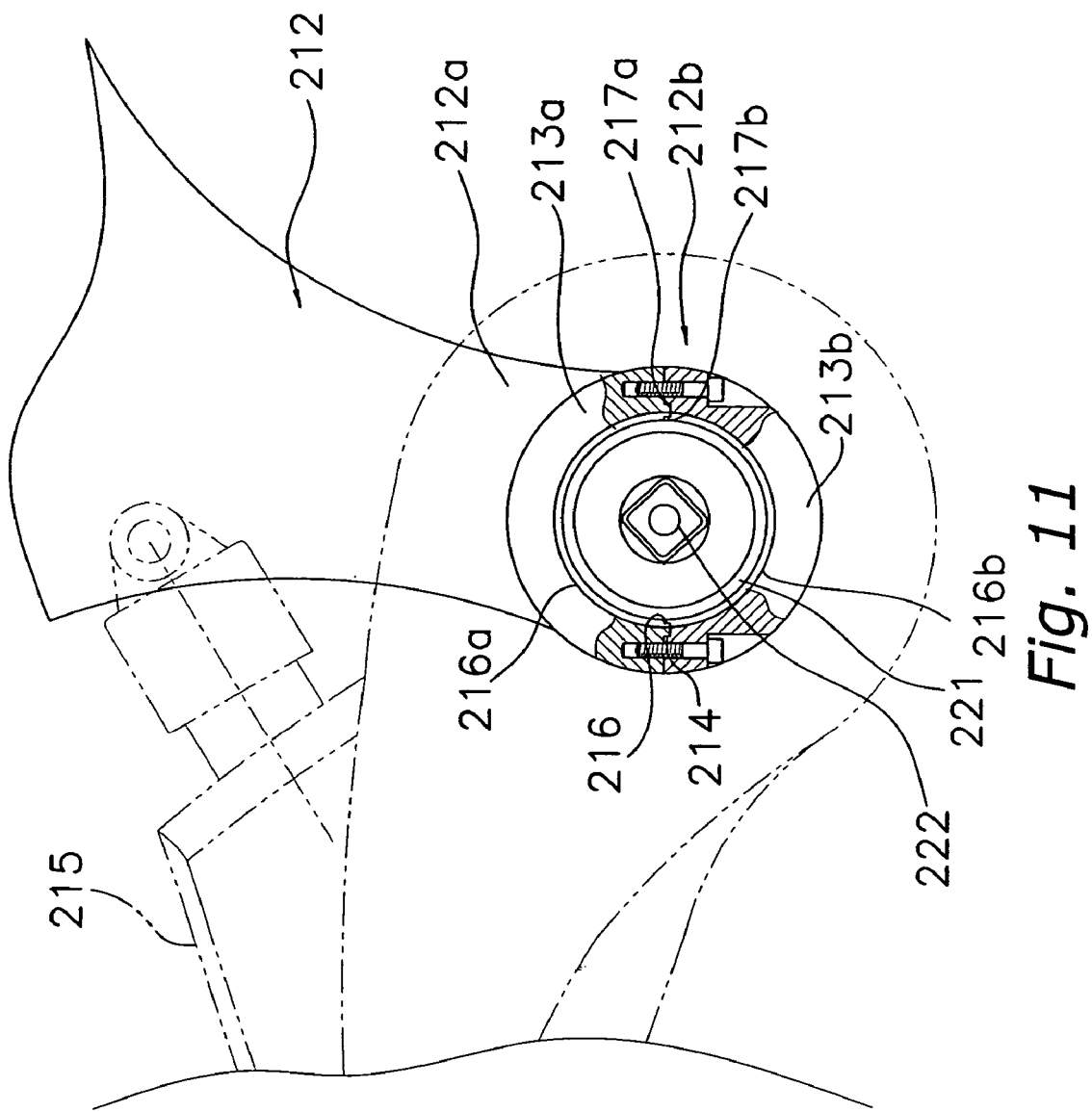
FIG. 11 is an enlarged right side partial cross sectional view of a first frame member of a drive unit with a first cover member removed in accordance with an alternative embodiment of the present invention.
Figure 12:
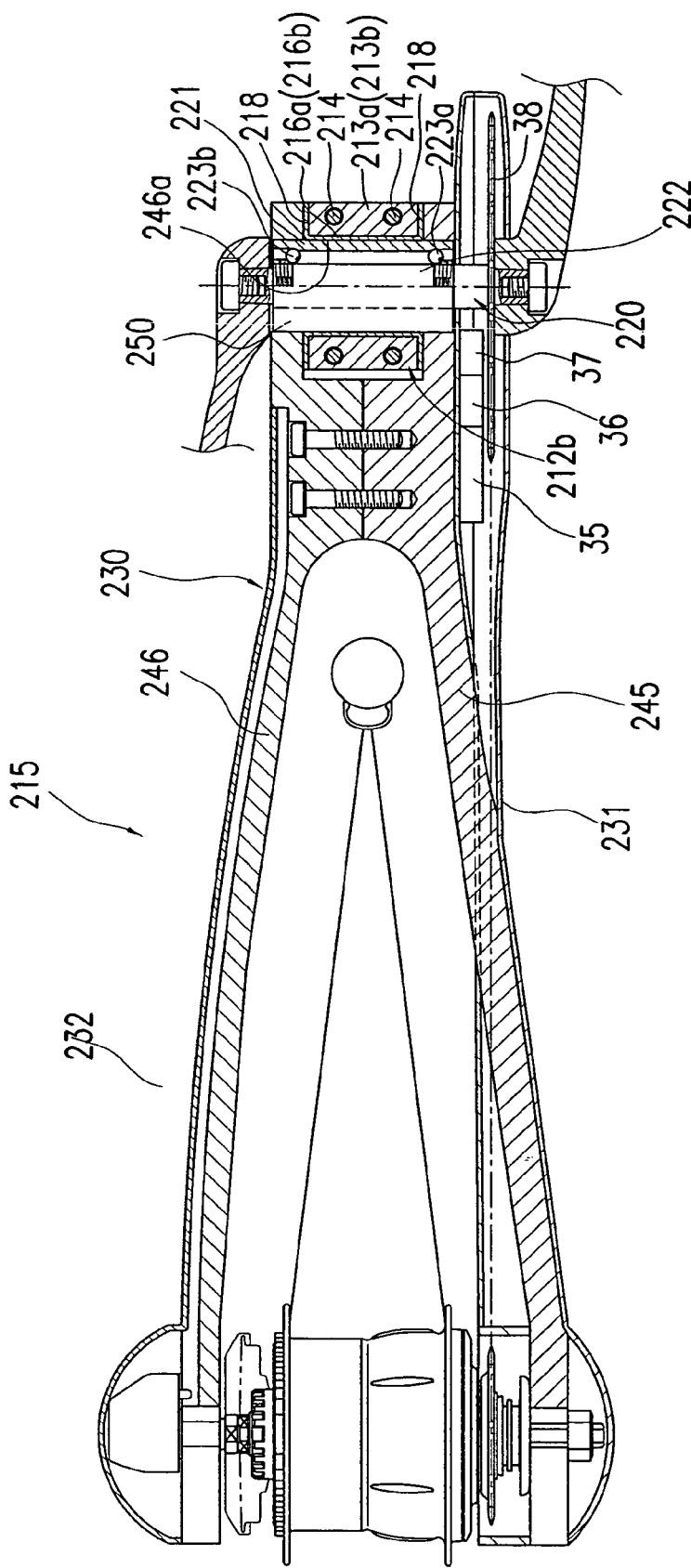
FIG. 12 is a schematic cross-sectional view for illustrating structural relationships between various components of the drive unit illustrated in FIG. 11 in accordance with the alternative embodiment of the present invention.

(c) In the above explained embodiment, the crank mounting shaft assembly 20 was disposed on the hanger part 12*a*. Alternatively, the functions of the crank mounting shaft assembly 20 can be incorporated in the drive unit 215 instead, to form a crank mounting shaft assembly 220, as shown in FIGS. 11 and 12. As a result, the crank mounting shaft assembly 220 can be disposed in the drive unit 215.

Referring to FIG. 11, a hanger part 212*a* of a frame body 212 has a split cylindrical movable support part 212*b*. The movable support part 212*b* has an upper semi-cylinder or half-cylinder 213*a* secured to the hanger part 212*a*, a lower semi-cylinder or half-cylinder 213*b* that is secured to the upper half-cylinder 213*a* via securing bolts 214, and a bushing 216. The bushing 216 comprises an upper half-bushing 216*a* that is mounted to the upper half-cylinder 213*a* and a lower half-bushing 216*b* that is mounted to the lower half-cylinder 213*b*. A pair of bumps 217*a* and 217*b* used for centering is respectively formed on the upper and lower half-cylinders 213*a* and 213*b* and the upper and lower half-bushings 216*a* and 216*b*. A pair of guards or flanges 218 is formed at both axial ends of the upper semi-bushing 216*a* and the lower semi-bushing 216*b* as seen in FIG. 12.

In this alternative embodiment of the present invention illustrated in FIGS. 11 and 12, a drive unit 215 has a frame main unit 230 movably mounted to the hanger part 212*a*, first and second cover members 231 and 232 mounted to the outer side surface of the frame main unit 230, the internal gear shift hub 33 mounted to the rear ends of the frame main unit 230, the gear positioning unit 35 (an example of an electric driving mechanism) configured and arranged to motorize the gear shifting operations of the internal gear shift hub 33, the circuit unit 36 (an example of a controller) configured to control the gear positioning unit 35, the condenser element 37 that serves as a power supply to supply power to the gear positioning unit 35 and the circuit unit 36, and the crank mounting shaft assembly 220, as shown in FIG. 12.

The crank mounting shaft assembly 220 is non-rotatably mounted to the front end of the frame main unit 230. The crank mounting shaft assembly 220 has a sleeve 221 (cylindrical swing support part) movably mounted to the upper and lower half-bushings 216*a* and 216*b*, a crank mounting shaft 222 rotatably mounted to the sleeve 221 via bearings 223*a* and 223*b*, and a pair of cranks 40 and 41 respectively mounted to axial ends of the crank mounting shaft 222.

The frame main unit 230 has a first frame member 245 that extends throughout the longitudinal length thereof and a second frame member 246 that is secured to the first frame member 245 via threaded securing bolts 255 and extends throughout the longitudinal length thereof. The first frame member 245 has a cylindrical movable mounting part 250 that is secured to the front end thereof. The movable mounting part 250 is inserted into a hole 246*a* formed in the second frame member 246 to form the sleeve 221 of the crank shaft mounting assembly 221 that extends in the front portion of the frame main unit 230 in a transverse direction as seen in FIG. 12. The frame members 245 and 246 respectively have first and second hub mounting parts 251*a* and 251*b* that sandwich the internal gear shift hub 33 disposed in the center of the rear wheel 16*r* at the rear ends of the respective frame members 245 and 246 after they diverge into two separate parts extending backward from the front end thereof. The flanges 218 of the upper and lower half-bushings 216*a* and 216*b* are in contact with the inner side surfaces of the first and second frame members 245 and 246 surrounding the movable mounting part 250. Other aspects of the construction of the drive unit 215 are basically identical to the previous embodiment explained above, and will not be described further herein for the sake of brevity.

Using the drive unit 215 having this construction explained above, by mounting the movable mounting part 250 to the half-bushings 216*a* and 216*b* and securing the drive unit 215 using the mounting bolts 214, the drive unit 215 comprising a finished product that incorporates the cranks 40 and 41, the front sprocket 38 and the chain 35 can be mounted to the frame 212.

(d) In the above explained embodiment, the gear positioning unit 35 was connected to the internal gear shift hub 33 via the gear shift cable 88. Alternatively, the gear positioning unit 35 can be directly connected to the internal gear shift hub 33 or to the switching mechanism for a rear gear shift apparatus such as a rear derailleur.

(e) In the above explained embodiment, the frame main unit 30 comprises the first frame member 45 and the second frame member 46. Alternatively, the frame main unit 30 can be formed as a unitary, one-piece member.

(f) In the above explained embodiment, the bicycle speed was detected from the output of the generator mechanism 76. Alternatively, a speed sensor may be disposed on the circuit unit, for example. Specifically, it is acceptable if a magnet is mounted to a spoke of the rear wheel, a lead switch, for example, is placed inside the circuit unit at a position at which the magnet can be detected, and the bicycle speed is detected from pulses output by the lead switch.

Accordingly, with the drive unit in accordance with the present invention, the hub of the rear wheel is disposed on first and second hub mounting parts and disposed at the rear end portions of the drive unit that comprise the ends of the frame main unit that extend in a diverging manner. As a result, the rear wheel is supported on both sides. Furthermore, the frame main unit is covered by first and second cover members and such that first and second spaces and are formed between the frame main unit and the first and second cover members. An electric driving mechanism that motorizes the gear shifting operations of the rear gear shift apparatus is disposed in the first space, and a controller that controls the electric driving mechanism and a power supply are disposed in one of the first and second spaces. Because the rear wheel hub is not supported in a cantilevered manner but is rather supported at both axial ends thereof, the rigidity of the frame unit can be maintained at a high level. In addition, because the electric driving mechanism that can motorize the gear shift operations of the rear gear shift apparatus is disposed in the first space and the controller that controls such mechanism and the power supply for the controller are disposed in one of the first and second spaces, motorization of the gear shift operations of the rear gear shift apparatus can be easily accommodated.

In accordance with a second aspect of the present invention, the rear hub is an internal gear shift hub including a force transmission mechanism configured and arranged to transmit the rotation of the drive cylinder to the hub shell via one of a plurality of multiple force transmission paths, as well as a switching mechanism configured and arranged to selectively switch among the force transmission paths. Therefore, motorization of the gear shift operations of the internal gear shift hub can be easily accommodated.

In accordance with a third aspect of the present invention, the rear hub further includes a generator mechanism that is aligned with the force transmission mechanism, configured and arranged to generate electric power from the relative rotation between the hub shell and the hub axle. The generator mechanism is configured and arranged to supply the generated power to the power supply unit. Therefore, the use of a condenser element such as a secondary battery or a power supply as a power supply unit permits the power supply unit to be recharged by power generated by the generator mechanism. As a result, consumption of the power supply is minimized, and motorized gear shift operation can be performed over a long period of time.

In accordance with a fourth aspect of the present invention, electric wiring is provided that electrically connects the generator mechanism and the power supply is disposed in at least one of the first or second cavities. Therefore, the presence of the electric wiring makes it unnecessary to lay down electric wiring between the power supply and the generator mechanism during the bicycle assembly process.

In accordance with a fifth aspect of the present invention, the electric driving mechanism is connected to the rear gear shift apparatus via a gear shift cable. Therefore, because the electric driving mechanism is connected to the internal gear shift hub via a gear shift cable rather than directly, the existing internal gear shift hub can be incorporated into a unit.

In accordance with a sixth aspect of the present invention, a speed sensor is provided that is connected to the controller and configured to detect the rotation speed of the rear wheel. Therefore, because the rotation speed of the rear wheel can be detected, the speed can be displayed on the bicycle and automatic gear shift control based on the bicycle speed can be performed.

In accordance with a seventh aspect of the present invention, a hub brake mechanism is provided, which is disposed on the rear hub and the frame main unit and brakes the rear wheel. Also, the frame main unit has a cable engaging part that engages with the brake cable that links the hub brake mechanism to a brake lever. Therefore, because the cable engaging part is disposed on the frame, the cable engaging part need not be disposed on the hub brake apparatus, and restrictions on the design of the hub brake apparatus can be minimized.

In accordance with an eighth aspect of the present invention, the movable mounting part is movably mounted to the frame around the crank mounting shaft. Therefore, because the drive unit moves around the crank mounting shaft, the distance between the crank mounting shaft and the hub axle does not change even if the drive unit moves, and chain vibration due to fluctuations in the length of the chain can be prevented.

In accordance with a ninth aspect of the present invention, the movable support part internally rotatably supports the crank mounting shaft of the bicycle. Therefore, because the crank mounting shaft is supported by a movable support part belonging to the frame main unit, the bicycle frame can be completed simply by mounting the drive unit to the bicycle frame, simplifying the bicycle assembly process.

In accordance with a tenth aspect of the present invention, the drive unit further includes a gear crank having a front sprocket mounted to one end of the crank mounting shaft and a left crank mounted to the other end of the crank mounting shaft. Therefore, the bicycle assembly process can be further simplified by mounting the gear crank and the left crank to the crank mounting shaft of the drive unit in advance.

In accordance with an eleventh aspect of the present invention, the drive unit further includes a chain that is suspended over the front sprocket and the rear sprocket. Therefore, by suspending the chain over a front sprocket and a rear sprocket, the drive unit can be shipped with the first and second cover members already mounted, further simplifying the bicycle assembly process.

Moreover, the present invention can be adapted as a bicycle chain stay configured to be coupled to the rear wheel 16r. In accordance with the present invention, the chain stay includes the frame main unit 30 that has the movable mounting part (50a and 50b) formed on a front end thereof, first and second hub mounting parts 51a and 51b that are disposed at rear ends of the frame main unit 30 that extend in a diverging manner from the front end toward the rear ends such that the first and second hub mounting parts 51a and 51b are disposed on both sides of the rear wheel 16r. The chain stay also includes an electric driving mechanism (i.e., the gear positioning unit 35) that is mounted to the frame main unit 30 and enables motorization of the gear shift operations of a bicycle gear shift apparatus.

With the bicycle chain stay in accordance with the present invention, the front end of the frame main unit 30 is movably mounted to the bicycle frame 12 around the crank mounting shaft 22. Furthermore, the frame main unit 30 has first and second hub mounting parts 51a and 51b at the rear end that diverges into two separate parts. The electric drive mechanism is mounted to the frame main unit 30. Here, because the rear wheel hub is supported at both ends, rather than being mounted in a cantilevered manner, the rigidity of the frame main unit 30 can be maintained. Moreover, when the rear wheel hub is mounted to the first and second hub mounting parts 51a and 51b formed in the second end of the frame main unit 30, even where a plurality of gears are used in an internal or external gear shift mechanism disposed on the rear wheel hub, gear shift operations such as gear shifting can be motorized by connecting this gear shift apparatus to the electric drive mechanism via a gear shift cable, permitting motorization of the gear shift operations of the rear gear shift apparatus to be easily accommodated. In addition, because the chain stay moves around the crank mounting shaft 22, the distance between the crank mounting shaft 22 and the hub axle does not change even if the chain stay moves, and chain vibration due to fluctuations in the length of the chain can be prevented.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle drive unit comprising:
    a frame main unit having a front end portion that is configured to couple to a bicycle frame and undergo limited pivotal movement with respect to the bicycle frame, the frame main unit diverging from the front end portion toward first and second rear end portions, the first and second rear end portions having respective first and second rear wheel hub mounting parts;
    first and second cover members coupled to transverse outer surfaces of the frame main unit such that a first space is formed between the first cover member and the frame main unit and a second space is formed between the second cover member and the frame main unit;
    a rear hub disposed between the first and second rear wheel hub mounting parts of the frame main unit comprising
        a hub axle fixed between the first and second rear wheel hub mounting parts of the frame main unit,
        a hub shell rotatably coupled to the hub axle,
        a drive cylinder coupled to one transverse end of the hub shell, and
        a rear sprocket fixed to the drive cylinder;
    a rear gear shift apparatus configured and arranged to shift between a plurality of force transmission paths of the hub shell relative to an input force;
    an electric motor disposed in the first space and linked to the rear gear shift apparatus to perform motorized gear shift operations of the rear gear shift apparatus;
    a controller disposed in one of the first and second spaces, and configured to control the electric motor; and
    a power supply unit disposed in one of the first and second spaces, and configured and arranged to provide electric power to the electric motor and the controller.

2. The bicycle drive unit according to claim 1, wherein the rear gear shift apparatus and the rear hub form an internal gear shift hub that includes a force transmission mechanism configured and arranged to transmit rotation of the drive cylinder to the hub shell via one of the force transmission paths, and a switching mechanism configured and arranged to selectively switch among the force transmission paths.

3. The bicycle drive unit according to claim 2, wherein the rear hub further includes a generator mechanism configured and arranged to generate electric power from relative rotation between the hub shell and the hub axle for supplying the electric power to the power supply unit.

4. The bicycle drive unit according to claim 3, further comprising
    an electric wiring disposed in at least one of the first and second spaces to electrically connect the generator mechanism with the power supply.

5. The bicycle drive unit according to claim 1, wherein the electric motor is operatively connected to the rear gear shift apparatus via a gear shift cable.

6. The bicycle drive unit according to claim 4, wherein the electric motor is operatively connected to the rear gear shift apparatus via a gear shift cable.

7. The bicycle drive unit according to claim 1, further comprising
    a speed sensor configured and arranged to detect a rotational speed of the hub shell and send a signal to the controller that is indicative of a rear wheel rotational speed.

8. The bicycle drive unit according to claim 6, further comprising
    a speed sensor configured and arranged to detect a rotational speed of the hub shell and send a signal to the controller that is indicative of a rear wheel rotational speed.

9. The bicycle drive unit according to claim 1, further comprising
    a hub brake mechanism disposed on the rear hub and the frame main unit configured and arranged to brake the hub shell relative to the hub axle, and
    the frame main unit having a cable engaging part that engages with a brake cable that links the hub brake mechanism to a brake lever of the bicycle.

10. The bicycle drive unit according to claim 8, further comprising
    a hub brake mechanism disposed on the rear hub and the frame main unit configured and arranged to brake the hub shell relative to the hub axle, and
    the frame main unit having a cable engaging part that engages with a brake cable that links the hub brake mechanism to a brake lever of the bicycle.

11. The bicycle drive unit according to claim 1, wherein the front end portion of the frame main unit is coupled to a cylindrical sleeve that extends around and supports a crank mounting shaft.

12. The bicycle drive unit according to claim 11, wherein the cylindrical sleeve internally supports the crank mounting shaft so that the crank mounting shaft freely rotates with respect to the cylindrical sleeve.

13. The bicycle drive unit according to claim 12, wherein the front end portion of the frame main unit is rotatably coupled to the cylindrical sleeve, and the cylindrical sleeve is non-rotatably fixed to the bicycle frame.

14. The bicycle drive unit according to claim 12, wherein the front end portion of the frame main unit is fixed to the cylindrical sleeve, while the cylindrical sleeve is configured to be rotatably coupled to the bicycle frame.

15. The bicycle drive unit according to claim 11, further comprising
a gear crank having a front sprocket mounted to a first axial end of the crank mounting shaft, and
a left crank mounted to a second axial end of the crank mounting shaft.

16. The bicycle drive unit according to claim 15, further comprising
a chain operatively coupling the front sprocket and the rear sprocket together.

17. A bicycle chain stay comprising:
a frame main unit diverging from a front end portion toward first and second rear end portions with the front end portion configured and arranged to mount to a frame of the bicycle and undergo pivotal movement with respect to the frame of the bicycle, and the first and second rear end portions having first and second rear wheel hub mounting parts, respectively, that are configured and arranged to be coupled to a rear wheel; and
an electric motor mounted to the frame main unit to perform motorized gear shift operations of a bicycle gear shift apparatus.

18. The bicycle chain stay according to claim 17, further comprising
first and second cover members coupled to transverse outer surfaces of the frame main unit such that a first space is formed between the first cover member and the frame main unit and a second space is formed between the second cover member and the frame main unit.

19. The bicycle chain stay according to claim 18, wherein the electric motor is disposed within the first space.

* * * * *